United States Patent
Madoch et al.

(10) Patent No.: US 6,628,774 B2
(45) Date of Patent: *Sep. 30, 2003

(54) METHOD OF ROUTING INTERLATA NETWORK TRAFFIC

(75) Inventors: Pitsa Madoch, Glenview, IL (US); John Wesley Moss, Lake Zurich, IL (US); Richard John Ebel, Algonquin, IL (US); Gerald Joseph Steffgen, Orland Park, IL (US); Carlos H Donoso, Bartlett, IL (US)

(73) Assignee: AmeriTech Corporation, Hoffman Estates, IL (US)

(*) Notice: Subject to any disclaimer, the term of this patent is extended or adjusted under 35 U.S.C. 154(b) by 282 days.

This patent is subject to a terminal disclaimer.

(21) Appl. No.: 09/792,105

(22) Filed: Feb. 22, 2001

(65) Prior Publication Data

US 2001/0005414 A1 Jun. 28, 2001

Related U.S. Application Data

(63) Continuation of application No. 09/197,386, filed on Nov. 20, 1998.

(51) Int. Cl.[7] ................................. H04M 7/00
(52) U.S. Cl. .................. 379/221.01; 379/220; 379/219; 379/230
(58) Field of Search ................................. 379/220, 219, 379/207, 230, 221, 201

(56) References Cited

U.S. PATENT DOCUMENTS

| | | | | |
|---|---|---|---|---|
| 5,661,782 A | * | 8/1997 | Bartholomew et al. | 379/230 |
| 5,740,231 A | * | 4/1998 | Cohn et al. | 379/201 |
| 5,781,620 A | * | 7/1998 | Montgomery et al. | 379/220 |
| 5,917,899 A | * | 6/1999 | Moss et al. | 379/220 |
| 5,940,378 A | * | 8/1999 | Ushiki et al. | 379/201 |
| 5,987,111 A | * | 11/1999 | Madoch et al. | 379/201 |

* cited by examiner

Primary Examiner—William J. Deane, Jr.
(74) Attorney, Agent, or Firm—Law Office of Dale B. Halling, LLC

(57) ABSTRACT

A method of routing interLATA network traffic includes the steps of receiving a number of dialed digits at a first service switching point (18) in a first virtual network (10). Then a query is sent to a service control point (24). When the dialed digits result in the call to a facility (32) in a second virtual network (26) connected to the first virtual network (10) by a tie line (38), the call is routed to a hub service switching point (34) in the second virtual network (26) over the tie line (38).

5 Claims, 7 Drawing Sheets

METHOD OF ROUTING INTERLATA NETWORK TRAFFIC

This is a continuation of application Ser. No. 09/197,386 filed on Nov. 20, 1998.

FIELD OF THE INVENTION

The present invention relates to wireless local loop systems and more particularly to the field of communications and more particularly to a method of routing interLATA network traffic.

BACKGROUND OF THE INVENTION

Telecommunication customers can have virtual private networks within a local access and transport area (LATA), that allow the customer to have abbreviated calling between numerous locations. The virtual private network for a local exchange carrier (LEC) is limited to a single LATA and many customers want a virtual private network that can encompass all virtual private networks in other LATAs. In addition, customers want to be able to aggregate their calls that are being carried by an inter-exchange carrier (IXC). IXCs provide discounts to customers who aggregate their calls. These interLATA calling concerns were only addressed in the past by building or leasing lines (DS-1) to connect the customers various offices. Another leased line was required to connect the at least one of the customer's facilities to an IXC POP (point of presence). Leasing DS-1 lines can be very expensive and can usually only be justified if the company uses the full capacity of the DS-1 lines. This excludes numerous companies and satellite offices.

Thus there exists a need for a method of routing interLATA network traffic, that overcomes these and other problems.

DETAILED DESCRIPTION OF THE DRAWINGS

The invention is a method of routing interLATA network traffic. The steps include receiving a number of dialed digits at a first service switching point in a first virtual private network. Then a query is sent to a service control point. When the dialed digits result in the call to a facility in a second virtual private network connected to the first virtual private network by a tie line, the call is routed to a hub service switching point in the second virtual private network over the tie line. When the call is not to a facility in the second virtual private network, the call is routed to a hub service switching point (SSP) in the first virtual private network. There the call is combined with other calls and routed on to an interexchange carrier (IXC) point of presence (POP). The invention connects virtual private networks in separate LATAs and aggregates interLATA calls that are carried by an IXC. The invention reduces the cost of long distance calls and extends the virtual private networks across multiple LATAs.

Figure 1:
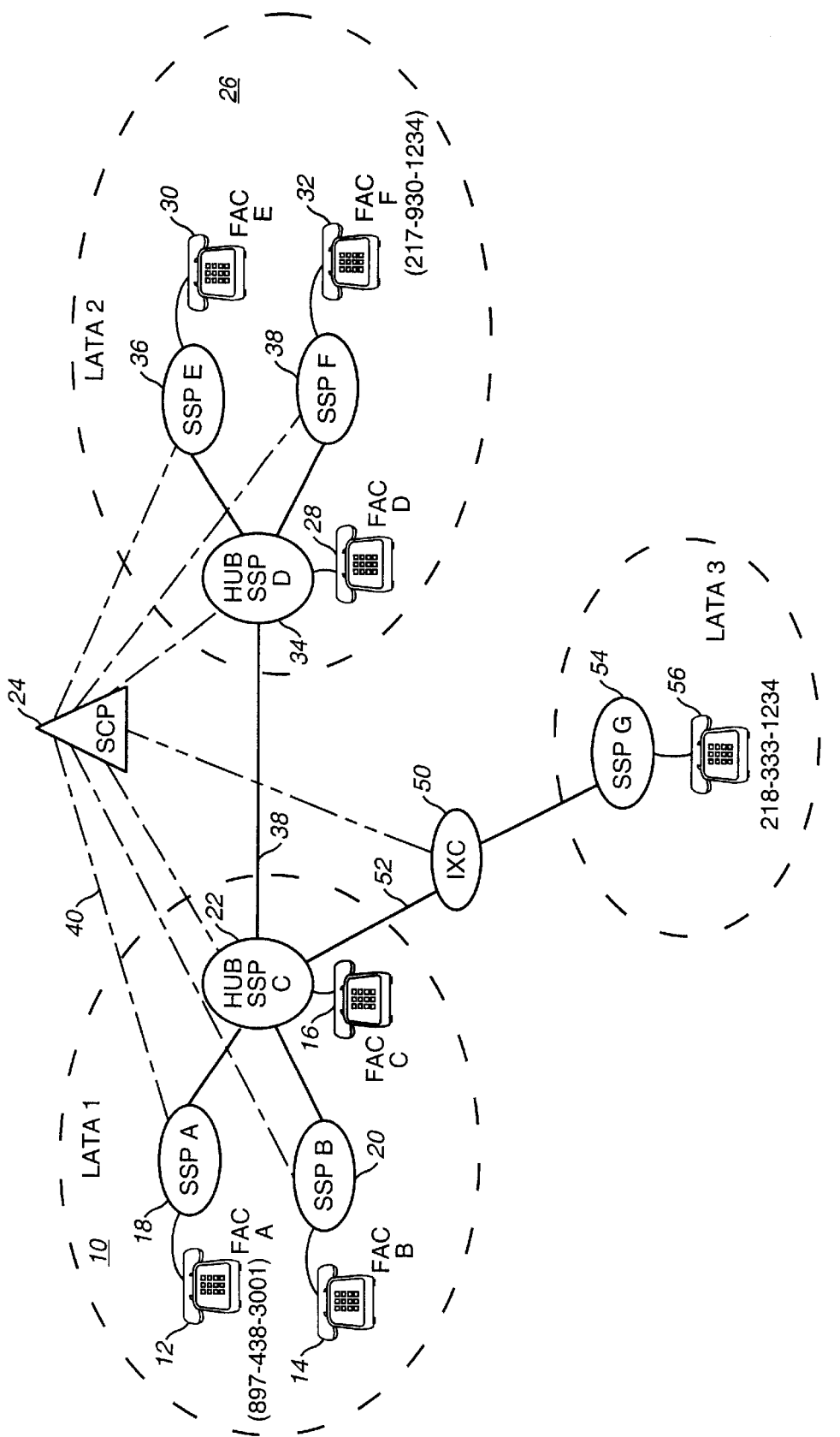
FIG. 1 is a schematic diagram of an advanced intelligent network capable of implementing the invention in accordance with one embodiment of the invention.

FIG. 1 is a schematic diagram of an advanced intelligent network capable of implementing the invention. The first virtual network 10 consists of a customer facility A 12, a customer facility B 14 and a customer facility C 16, in a first local access and transport area (LATA). The facilities 12–16 are connected to service switching point A (SSP A) 18, SSP B 20 and HUB SSP C 22. The SSPs 18–22 are all connected by the public switched telephone network. Each of the SSPs 18–22 is connected to a switching control point (SCP) 24 by a signal system seven (SS7) signaling links. The first virtual network connects the customer's facilities A-C 12–16 in the first LATA and provides abbreviated dialing, intercom calling and other features among the facilities 12–16.

The second virtual network 26 in LATA 2 (second local access and transport area) connects facility D 28, facility E 30 and facility F 32 together. The facilities D-F are connected through HUB SSP D 34, SSP E 36 and SSP F 38. As in the first virtual network 10, the SSPs 34–38 are connected by the public switched telephone network. Each of the SSPs 34–38 is also connected to the SCP 24 by the SS7 signaling links. A tie line (DS-1) 38 connects a first hub SSP 22 in the first virtual network 10 to a second hub SSP 34 in the second virtual network 26. The figure could be expanded to show a plurality of virtual networks, wherein a plurality of tie lines are used to connect a plurality of hub service switching points in the plurality of virtual networks. The operation of this expanded diagram would be unchanged from the simpler version shown in FIG. 1.

In a first example of the invention, a customer at facility A 12 places a call to a customer at facility F 32. In this example the customer dials an abbreviated dial code (e.g., 6000) (plurality of digits, plurality of dialed digits, network access request). SSP A 18 triggers on the abbreviated dial code and sends a query (first query) over the SS7 signal link 40 to the SCP 24. The SCP 24 determines that the abbreviated dial code is an interLATA call and transmits a response (first response) containing a called party ID parameter that is the routing number of the first hub SSP 22. In addition, the SCP 24 converts the abbreviated dial code to a translated routing number (e.g., 217-936-1234) and sends this to the SSP A 18. The SSP A 18 routes the call (network connection) to the first hub SSP 22 based on the response. In addition, the SSP A 18 sends an initial address message (IAM) over the SS7 signaling links to the hub SSP 22. The IAM includes the translated routing number and the called number (routing number of the hub SSP 22).

The hub SSP 22 triggers on the called number and sends a second query to the SCP 24. The SCP 24 converts the original called number back into the abbreviated dial code and determines the primary trunk group that specifies the tie line 38. The SCP 24 also determines the billing information at this point. The SCP 24 then sends a response with the primary trunk group, billing information and the abbreviated dial code to the hub SSP 22. The first hub SSP 22 then routes the call over the tie line 38 to the second hub SSP 34. The first hub SSP 22 also sends the abbreviated dial code to the second hub SSP 34.

The second hub SSP 34 triggers on the abbreviated dial code and sends a third query to the SCP 24. The SCP 24 converts the abbreviated dial code to the translated routing number and sends a third response (third routing instruction) to the second hub SSP 34 with this information. The second hub SSP 34 then routes the call to a second service switching point 38. The second SSP 38 then routes the call to the call party at facility F 32.

In another example, the customer at facility A 12 places a call to a telephone at facility F 32, by dialing an access code and ten digit number (e.g., 9-1-217-936-1234). In this case the SSP 18 triggers on the access code (i.e., 9) and sends a query to the SCP 24. The SCP 24 determines the dialed digits are a direct dial interLATA call and sends a response including a hub SSP 22 routing number. The SSP 18 routes the call to the hub SSP 22 based on the routing number. The hub SSP 22 again triggers on the called number and sends a second query to the SCP 24. The SCP 24 determines that the plurality of dialed digits have an access to virtual networks abbreviated dial code (i.e., 6000). In addition, the SCP 24 determines that the call is to be routed by tie line 38. The SCP 24 sends a second response (second routing instruction) including the primary trunk group and the abbreviated dial code. The rest of the processing of the call is the same as the first example from here.

In a third example a customer at facility C 16 places a call to facility F 32. The customer dials the abbreviated dial code. The hub SSP 22 uses the same processing as above to determine if the call is an access to private networks call to determine that the call is to be routed over tie line 38. The hub SSP 22 routes the call over the tie line 38 and sends the abbreviated dial code over the tie line 38 to the second hub SSP 34. The call is then processed in the same way as the previous examples.

In a fourth example a call is placed to facility D 28. In this example, the second hub SSP 34 receives the call and the abbreviated dial code like the examples discussed above. The SSP 34 then performs a centrex translation to determine the routing number of the called party and routes the call to the called party (terminating point) at facility D 28.

Aggregating calls to an interexchange carrier can save a company money. An example of how the invention aggregates out-of-network calls is explained below. A subscriber 12 places an abbreviated call (network traffic access request) by dialing 7000 at one of his plurality of locations. The call is received at service switching point A (SSP A, one of a plurality of central office switches) 18. The SSP 18 sends a query (information analyzed query) to a switching control point (SCP) 24 over a signal system seven (SS7) signaling link 40. The query contains the calling party ID (i.e., 847-438-3001) and dialed digits (i.e., 7000). The SCP 24 translates the dialed digits into a corresponding routing number (e.g., 218-333-1234) and determines that the call is a direct dial interLATA call (interLATA network traffic request). In this example the call is also out-of-network. The SCP 24 determines that the call is to be redirected to the hub SSP C 22. The SCP 24 sends a response (analyze route message, routing instruction) over the SS7 signaling link, that directs the SSP A 18 to route the call to the hub SSP C 22. This is accomplished by having the called party ID portion of the message set equal to the directory number of the hub SSP 22. The translated or true called routing number is returned in the redirected party ID parameter. The SSP (central office) 18 then routes the call (network traffic) to the hub SSP (hub central office) 22 over the public network that connects SSP A, SSP B and SSP C together. In addition, the SSP 18 sends an initial address message (IAM) over the signal system 7 (SS7) signaling links that connects the SSPs 18, 20, 22, to the SCP 24. The IAM contains the translated or true called number (i.e., 218-333-1234) and the called number, which is the directory number of the hub SSP 22. The hub SSP (hub central office) 22 triggers on the called number and sends a second query (second information analyzed query) to the SCP 24. The SCP 24 then sends a second response (second analyze route message) containing routing information (translated or true routing number) to a single IXC POP 50, a billing information and a primary trunk group. The hub SSP 22 routes the call to the IXC POP 50 over a shared or private facility 52 using the routing information received in the second response. Thus the calls are aggregated with other calls (a plurality of other calls) at the hub SSP 22 and routed to one of the plurality of inter-exchange carrier selections. When a shared facility 52 is used to route the call, the hub SSP 22 sends an IAM to the IXC 50 using SS7 signaling. When a shared facility 52 having feature group D signaling is used, a charge number (hub SSP number) and a called number (i.e., 218-333-1234) are passed to the IXC 50. When a private facility 52 having standard tie lines is used, only the called number is passed on to the IXC 50. When private facilities having a primary rate ISDN are used, the charge number and the called number are passed to the IXC 50.

The IXC 50 then routes the call using standard long distance techniques to a SSP G 54 in the LATA 3 of the dialed number. The SSP 54 routes the call to the called party 56.

A method of aggregating off network calls is explained next. In this example, the calling party 12 dials an access code (i.e., 9) and then dials a plurality of digits (i.e., 217-936-1234#). The "#" is optional and expedites processing of the call. The SSP 18 receives the access code and dialed digits. Upon determining that the access code is present, the SSP 18 sends a query containing the plurality of digits to the SCP 24. The SCP 24 will determine that the call is an interLATA call and check to see if the number is restricted. The restriction of called numbers will be discussed in more detail with respect to FIGS. 6–7. When the call is not restricted, the SCP 24 sends a response redirecting the call to the hub SSP 22. The call is then processed in the same manner as discussed above.

Figure 2:
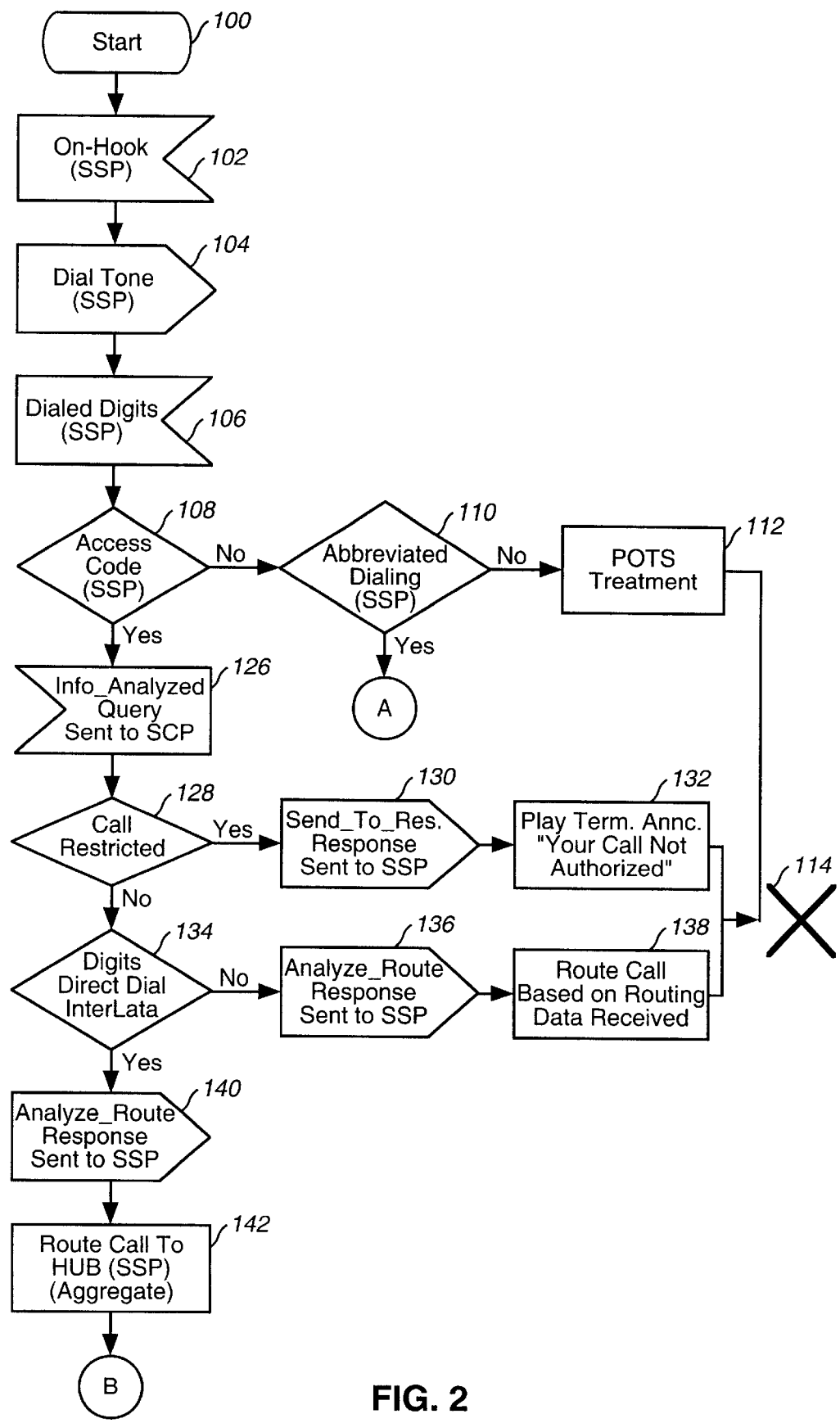
FIGS. 2–5 are a flow chart of an embodiment of the steps performed by a service switching point and a switching control point in accordance with one embodiment of the invention.

FIG. 2 is a flow chart of an embodiment of the steps performed by a service switching point and a switching control point according to the invention. The process starts, step 100, with the first SSP receiving an off-hook signal at step 102. The first SSP then sends a dial tone to the originating telephone at step 104. The first SSP receives a plurality of dialed digits at step 106. At step 108 it is determined if the plurality dialed digits include an access code. When the plurality dialed digits do not include the dial plan escape access code, the SSP determines if the plurality dialed digits is an abbreviated dial code at step 110. When the plurality dialed digits is not the abbreviated dial code, the call is processed by standard POTS (plain old telephone service) or centrex translation at step 112. This will only occur using this service if an error has occurred. The call processing then terminates at step 114.

Figure 3:
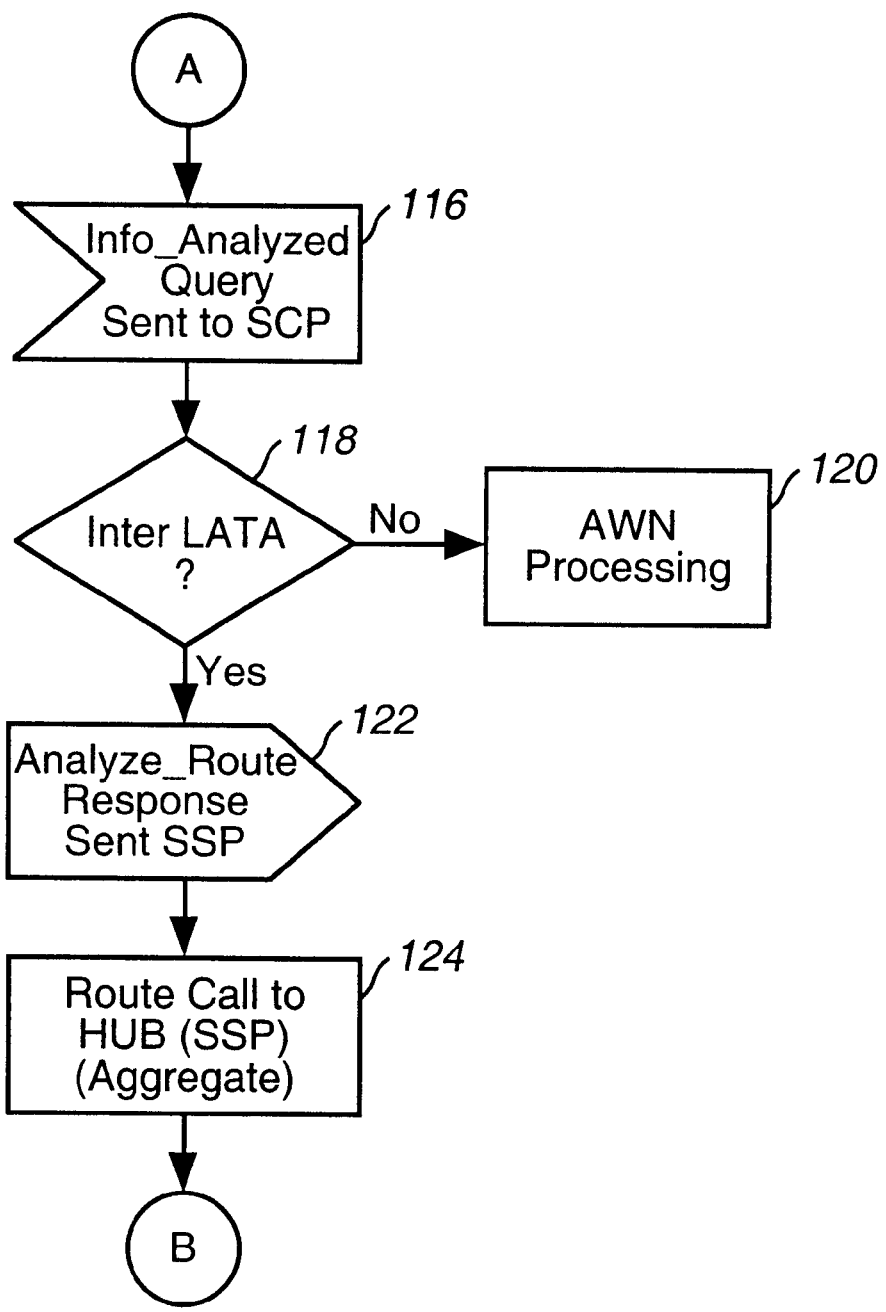

When the plurality dialed digits is the abbreviated dial code, at step 110, the process proceeds at A on FIG. 3. The first SSP sends an information analyzed query at step 116, containing the abbreviated dial code. The SCP then determines if the call is an in-network interLATA call at step 118. When the call is not the interLATA call, standard area wide network (AWN) processing occurs at step 120. This is not the standard processing route for this service. When the call is the in-network interLATA call, sending an analyze route response to the first SSP containing the routing number of the hub SSP and a translated routing number at step 122. The call is then routed by the first SSP to the first hub SSP at step 124.

When the plurality dialed digits includes the access code at step 108, sending an information analyzed query including the plurality of dialed digits less the access code to the SCP at step 126. The SCP then determines if the call is restricted at step 128. When the call is restricted, a restricted call response message is sent to the SSP at step 130. The SSP then plays the terminating announcement that the call is not authorized at step 132, which ends the processing at step 114.

When the call is not restricted at step 128, the SCP determines if the dialed digits (plurality of dialed digits) require a direct dialed interLATA call at step 134. When the call is not the direct dialed interLATA call, a normal route response is sent to the SSP at step 136. The SSP then routes the call based on the normal route response at step 138, which ends processing at step 114.

When the call is the direct dialed interLATA call, an analyze route response is transmitted to the SSP at step 140. The SSP then routes the call to the hub SSP for aggregation at step 142 and sends an initial address message to the hub SSP. Processing then continues with the first hub SSP at B on FIG. 4.

Figure 4:
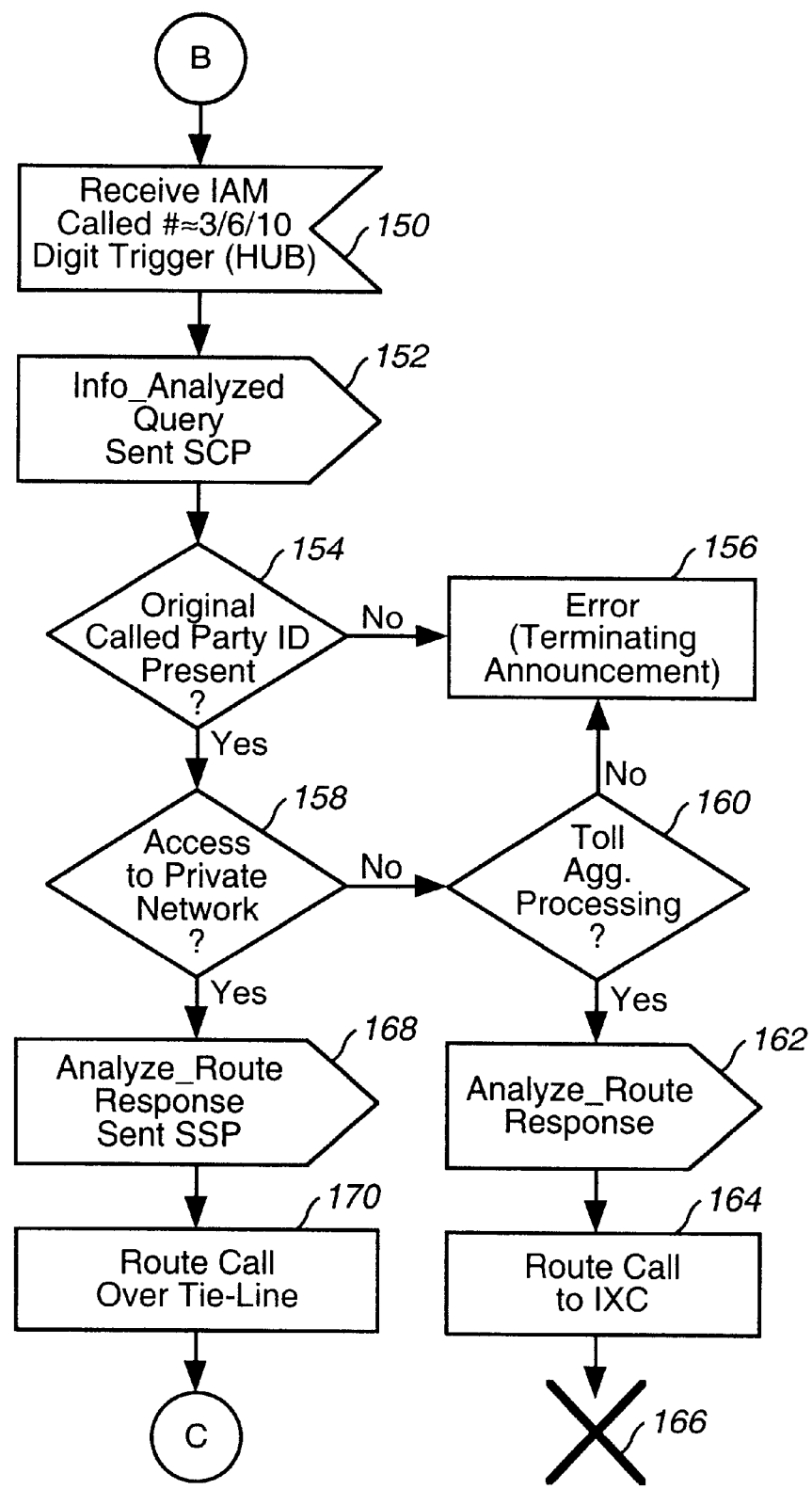

Call processing then starts at B of FIG. 4. FIG. 4 is a flow chart of an embodiment of the steps performed by a hub service switching point and the switching control point according to the invention. The hub SSP receives an initial address message sent by the first SSP (first service switching point) at step 150. The hub SSP triggers on the called number and sends an information analyzed query to the SCP at step 152. The SCP determines if the original called party ID is present at step 154. When the original called party ID is not present at step 154, an error has occurred and a terminating announcement is played at step 156.

When the original called party ID is present, it is determined if call is an access to virtual networks call at step 158. When the call is not an access to virtual networks call, then it is determine if the call is a toll aggregation call at step 160. When the call is not the toll aggregation call, an error has occurred and a terminating announcement is played at step 156. When the call is the toll aggregation call, an analyze response message is sent to the hub SSP at step 162. The hub SSP routes the call to a preferred interexchange carrier at step 164, which ends call processing at step 166. The toll aggregation processing 158–166 is explained in detail with respect to FIGS. 6–7.

When the call is the access to virtual networks call at step 158, an analyze route message is sent to the hub SSP at step 168. The analyze route message contains the abbreviated dial code of the called party and the primary trunk group of the tie line. The hub SSP routes the call over the tie line at step 170. Call processing then continues at C on FIG. 5.

Figure 5:
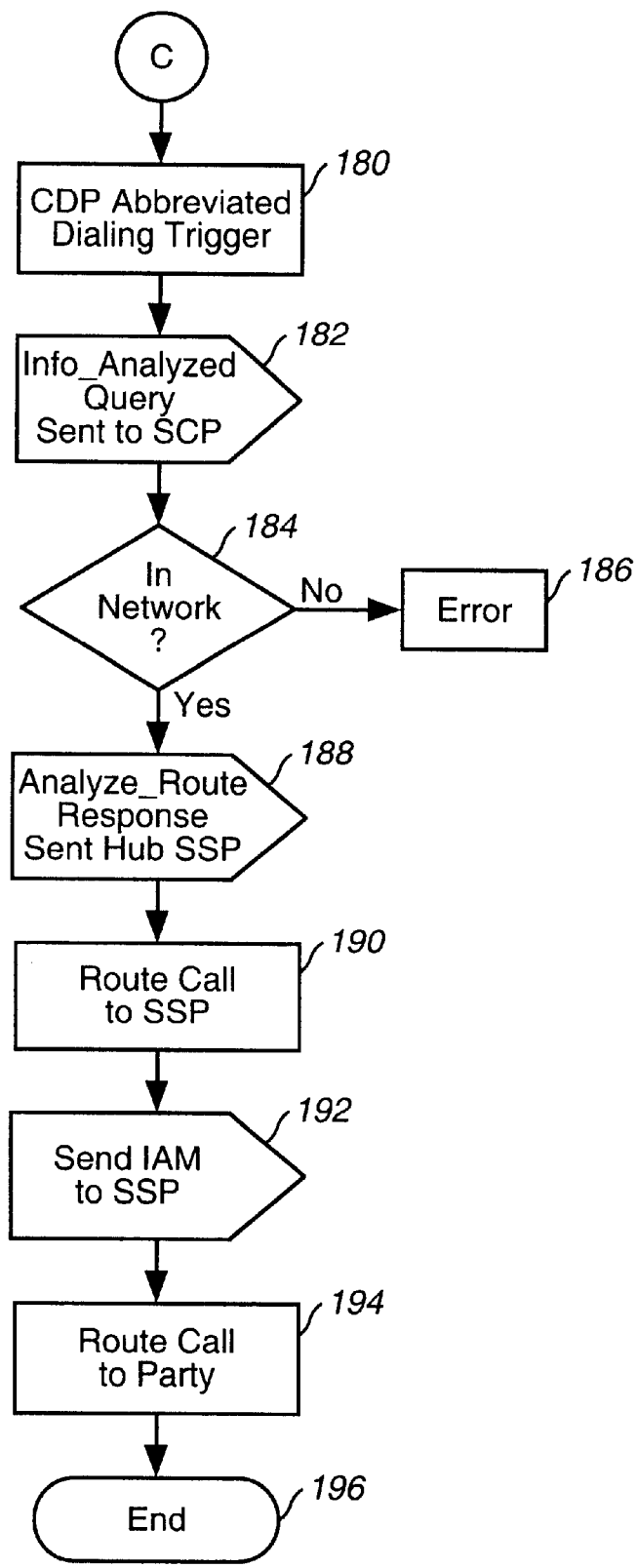

FIG. 5 is a flow chart of an embodiment of the steps performed by a second hub service switching point, the switching control point and a second service switching point according to the invention. The second hub SSP receives the customized dialing plan (CDP) abbreviated dial code and trigger on the code at step 180. The second hub SSP then sends an information analyzed query to the SCP at step 182. The query includes the abbreviated dial code. The SCP determines if the call is in-network at step 184. When the call is not in-network an error has occurred in the service at step 186. When the call is in-network, the SCP then sends an analyzed route message containing a routing instruction at step 188. The hub SSP then routes the call to a second hub SSP at step 190 based on the routing instruction. The second hub SSP also sends an IAM to the second SSP (second service switching point) at step 192 containing a translated routing number. The translated routing number is the directory number associated with the abbreviated dialing code. The second SSP then routes the call to the called part at step 194, which ends call processing at step 196.

Figure 6:
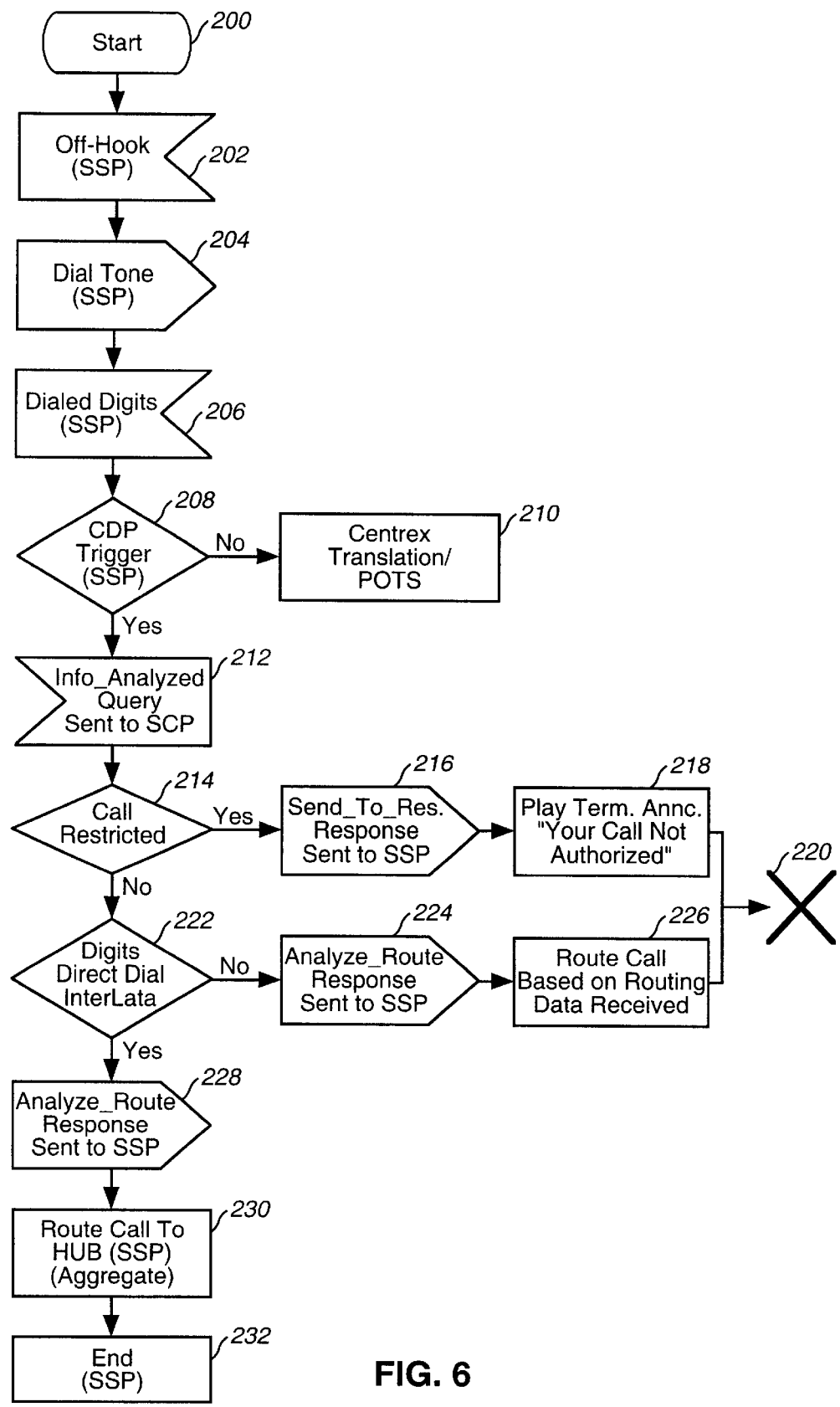
FIGS. 6–7 are a flow chart of an embodiment of the steps a service switching point and a switching control point use in implementing the invention in accordance with one embodiment of the invention.

FIG. 6 is a flow chart of an embodiment of the steps a Service Switching Point (SSP) and a Switching Control Point (SCP) use in implementing the invention. The process starts, step 200, by the SSP receiving an off-hook signal from a customer telephone, at step 202. The SSP sends a dial tone to the customer telephone at step 204. The SSP then receives the dialed digits (destination number) at step 206. At step 208 the SSP determines if an access code (or Customized Dialing Plan trigger) is present. When the access code or CDP trigger is not present, centrex translation/POTS (plain old telephone service) processing is pursued at step 210. Step 210 is performed when the calling facility is directly connected to the hub SSP.

When the access code is present, an information analyzed query is sent to the SCP at step 212. The SCP then determines if the call is restricted at step 214. When the call is restricted a restricted call response message is sent to the SSP at step 216. The SSP then plays the terminating announcement that the call is not authorize at step 218, which ends the processing at step 220.

When the call is not restricted at step 214, the SCP determines if the dialed digits (plurality of dialed digits) require a direct dialed interLATA call at step 222. The service of toll aggregation requires that the call be the directed dialed interLATA. However, if the call is not the direct dialed interLATA call a routing response is sent to the SSP at step 224. The SSP then routes the call based on the routing response at step 226, which ends processing at step 220.

When the call is the direct dialed interLATA call, an analyze route response is transmitted to the SSP at step 228. The SSP then routes the call to the hub SSP for aggregation at step 230 and sends an initial address message to the hub SSP, which ends the processing for initiating SSP at step 232.

Figure 7:
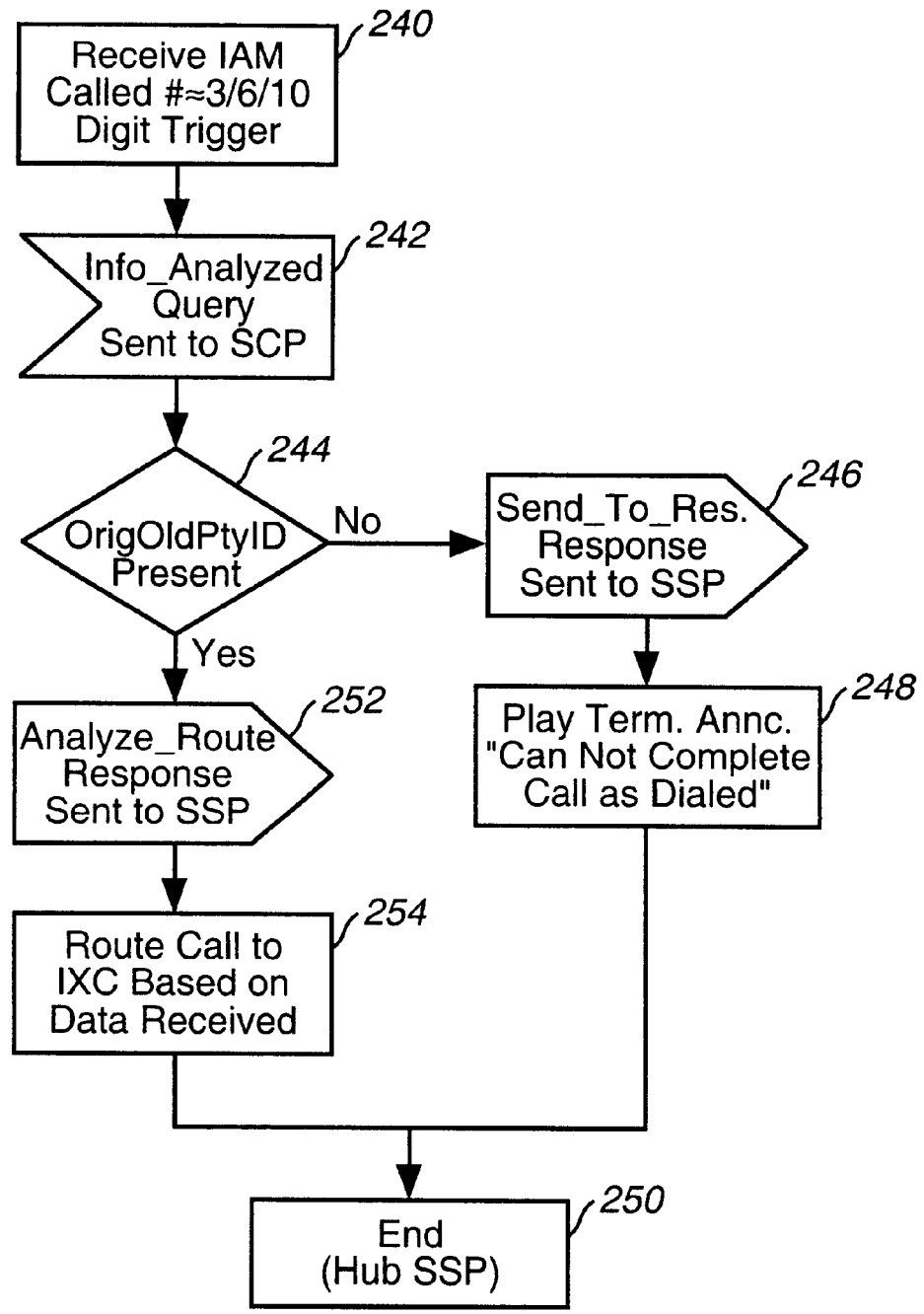

FIG. 7 is a flow chart of an embodiment of the steps a hub SSP and the SCP use in implementing the invention. The process starts by the hub SSP receiving the IAM and determining that the called number is a 3/6/10 digit trigger at step 240. Based on this trigger the hub SSP transmits an information analyzed query to the SCP at step 242. Next, the SCP determines if the original called party ID is present at step 244. When the original called party ID is not present, sending a cannot complete response to the hub SSP at step 246. A terminating announcement is played that the call cannot be completed at step 248, which ends the call processing for the hub SSP at step 250.

When the original called party ID is present, sending an analyze route message to the hub SSP at step 252. The hub SSP then routes the call to the IXC based on the data received at step 254, which ends the call processing for the hub SSP at step 250.

The invention allows customers to link their virtual networks across LATAs and to aggregate interLATA calls.

The methods described herein can be implemented as computer-readable instructions stored on a computer-readable storage medium that when executed by a computer will perform the methods described herein.

While the invention has been described in conjunction with specific embodiments thereof, it is evident that many alterations, modifications, and variations will be apparent to those skilled in the art in light of the foregoing description. Accordingly, it is intended to embrace all such alterations, modifications, and variations in the appended claims.

What is claimed is:

1. A method of routing interLATA network traffic, comprising the steps of:
   (a) receiving a plurality of digits at a first service switching point in a first virtual network in a first LATA;
   (b) sending a query to a switching control point from the first service switching point;
   (c) when the plurality of digits result in a call that is an interLATA call, sending a response including a routing instruction to a hub service switching point;
   (d) routing a network traffic to a hub service switching point in the first virtual network in the first LATA;
   (e) combining the network traffic with a plurality of other network traffic at a hub service switching point in the first virtual network in the first LATA.

2. The method of claim 1, further including the steps of:
   (f) when the plurality of calls is to a facility in a second virtual network which is connected by a tie line, transmitting an initial address message for each of the plurality of calls to the hub service switching point;
   (g) sending a second query to the switching control point from the hub service switching point;
   (h) receiving a second response from the switching control point;
   (i) routing the plurality of calls over a tie line to a second hub service switching point in a second local access and transport area; and
   (j) separating a call from the plurality of calls.

3. The method of claim 2, further including the steps of:
   (k) sending a third query to the switching control point from the second hub service switching point;
   (l) receiving a third response from the switching control point;
   (m) routing the call to a second service switching point.

4. The method of claim 3, further including the steps of:
   (n) routing the call prom the second service switching point to a called party.

5. The method of claim 1, further including the steps of:
   (f) when the call is not to a facility in a second virtual network which is connected by a tie line, routing the network traffic to a point of presence associated with one of a plurality of inter-exchange carrier selections.

* * * * *

UNITED STATES PATENT AND TRADEMARK OFFICE
CERTIFICATE OF CORRECTION

PATENT NO. : 6,628,774 B2   Page 1 of 1
APPLICATION NO. : 09/792105
DATED : September 30, 2003
INVENTOR(S) : Madoch et al.

It is certified that error appears in the above-identified patent and that said Letters Patent is hereby corrected as shown below:

Please insert the following as the first paragraph on page 1 line 5:

-- This patent arises from a continuation of U.S. Patent Application 09/197,386, filed on November 20, 1998, now U.S. Patent No. 6,400,818, which is a continuation-in-part of application No. 08/768,382, filed on December 17, 1996, now U.S. Patent No. 5,917,899. U.S. Patent Application 09/197,386 is also a continuation-in-part of application No. 08/766,598, filed on December 12, 1996, now U.S. Patent No. 5,987,111. --

Signed and Sealed this

Seventh Day of December, 2010

David J. Kappos
*Director of the United States Patent and Trademark Office*